(12) United States Patent
Zielinski et al.

(10) Patent No.: US 6,883,144 B2
(45) Date of Patent: Apr. 19, 2005

(54) SYSTEM SUPPORTING USE OF CUSTOMIZABLE EXPRESSIONS BY APPLICATIONS

(75) Inventors: Paul Zielinski, Gilbertsville, PA (US); John D. Haley, Honey Brook, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 542 days.

(21) Appl. No.: 09/981,398

(22) Filed: Oct. 17, 2001

(65) Prior Publication Data

US 2002/0198876 A1 Dec. 26, 2002

Related U.S. Application Data

(60) Provisional application No. 60/307,193, filed on Jul. 23, 2001, and provisional application No. 60/300,893, filed on Jun. 26, 2001.

(51) Int. Cl.⁷ .............................................. G06F 3/00
(52) U.S. Cl. ..................... 715/765; 715/810; 715/835; 715/846; 715/538; 707/104.1
(58) Field of Search ................................ 715/700, 764, 715/765, 780, 810, 835, 846, 538; 707/1–5, 104.1, 200; 345/700, 764, 765, 780, 810, 835, 846, 967, 968

(56) References Cited

U.S. PATENT DOCUMENTS

| 5,566,330 | A | * | 10/1996 | Sheffield ........................ 707/4 |
| 5,742,836 | A | * | 4/1998 | Turpin et al. ................ 715/507 |
| 5,842,209 | A | * | 11/1998 | Mocek et al. ................... 707/4 |
| 5,897,649 | A | * | 4/1999 | Kennedy ..................... 715/538 |
| 6,330,006 | B1 | * | 12/2001 | Goodisman ................. 345/762 |
| 6,671,691 | B1 | * | 12/2003 | Bigus .......................... 707/102 |
| 6,674,452 | B1 | * | 1/2004 | Kraft et al. ................. 345/765 |

FOREIGN PATENT DOCUMENTS

| EP | 0667585 A1 | * | 8/1995 | .......... G06F/17/30 |
| EP | 0 722 140 A1 | | 7/1996 | ............. G06F/9/06 |
| GB | 2 320 111 A | | 6/1998 | ............. G06F/9/44 |
| JP | 61273636 A | * | 12/1986 | ............. G06F/9/06 |
| JP | 07036919 A | * | 2/1995 | .......... G06F/17/30 |
| JP | 09044510 A | * | 2/1997 | .......... G06F/17/30 |
| WO | WO 98/04982 | * | 2/1998 | .......... G06F/17/30 |
| WO | WO 01/06357 A1 | | 1/2001 | ............. G06F/9/44 |

OTHER PUBLICATIONS

Tom Spitzer, "Catching up with Clarion", Jun. 1996, DBMS, v9, n7, p92(4).*

Judy Duncan, dBase IV: Version 1.5, Sep. 1992, InfoWorld, v14, n39, p64(5).*

(Continued)

Primary Examiner—X. L. Bautista
(74) Attorney, Agent, or Firm—Alexander J. Burke

(57) ABSTRACT

A user friendly interface system enables a user to incorporate, in an executable application, custom decision logic in the form of an expression involving a high-level script language. A system supports use of user customizable expressions by a plurality of different executable applications. The system involves a database for associating a particular application of the plurality of different executable applications with a particular data item of a plurality of selectable data items available for incorporation in a user entered expression. The database is also employed in excluding use by the particular application of another data item of the plurality of selectable data items. An interface processor receives a user entered expression and incorporates the particular data item in the user entered expression to provide a resultant expression for use by the particular application. An expression processor checks expression syntax and uses a version identifier to identify a latest version of the entered expression to be processed to provide a result.

22 Claims, 7 Drawing Sheets

OTHER PUBLICATIONS

J. Clapp, "ProCite 4: ISI ResearchSoft www.risinc.com", Dec. 1999, Information Technology & Libraries, v18, n4, p. 229–230.*

Charlie Darling, "Superbase: version 2.0 A", Aug. 1993, v15, n33, p73(3).*

"SQRIBE Releases New VisualSQRIBE Interactive Report Builder", Aug. 1998, Business Wire, p0177.*

Sally Blanning Dejean, "Fox–BASE+–Mac provides Mac users with fast, true dBASE compatibility", Sep. 1988, PC Week, v5, n36, p88(2).*

John Bell, "AceFile 1.0: graphics database", Jan. 1992, PC Sources, v3, n1, p385(1).*

Karl Goldstein, "ArcView 2.1", Jan. 1996, Macworld, v13, n1, p55(2).*

* cited by examiner

FIG. 6

SYSTEM SUPPORTING USE OF CUSTOMIZABLE EXPRESSIONS BY APPLICATIONS

This application is co-pending with commonly owned related application, Ser. No. 09/975,681 filed Oct. 11, 2001.

This is a non-provisional application of provisional application Ser. No. 60/300,893 by J. Haley et al. filed Jun. 26, 2001 and of provisional application Ser. No. 60/307,193 by J. Haley et al. filed Jul. 23, 2001.

FIELD OF THE INVENTION

This invention concerns a system and user interface supporting multiple different executable applications employing user customizable expressions for determining computable values or searching for records, for example.

BACKGROUND OF THE INVENTION

It is desirable for software applications executing on PCs, servers and other processing devices for business or other purposes to offer users the capability of customizing application functions to meet specific customer needs. To this end, it is advantageous to allow an application to support the use of a user customizable expression to determine particular decision logic to be used by the application. Such an expression may take various forms and may include algebraic elements for implementing a variety of functions including, for example, computing a value or range of values, defining search criteria for performing a record search as well as defining a statement to be verified. In a health care payment processing system, a user may enter a customizable expression to estimate an insurance company reimbursement sum for a particular procedure, or to search for particular patient records or to verify particular eligibility criteria of a specific patient, or for many other purposes, for example.

A number of problems arise in offering a user the capability of customizing expressions for use with one or more software applications. These include the difficulty posed in providing a user interface that is straightforward to use by a person who is not a software programmer and yet provides the capability to implement any function that the user may desire. Other difficulties arise in integrating the entered expression with the associated software application in a manner that allows execution of the application together with the expression in an efficient manner without significant degradation in execution speed. A further difficulty arises in maintaining multiple expressions (perhaps hundreds or thousands of expressions) associated with multiple different applications and managing the update, editing and replacement of expressions. An expression may become obsolete, for example, if data used by an associated application is changed.

One known system allows a user to define an expression for use with an application by employing an extensive decision matrix of available customizable expression options and associated data to be used with the expression options. This approach limits the expressions that may be used to those supported by the decision matrix and results in the creation of a complex matrix that is not user friendly. Another known system allows a user to define an expression using SQL (Structured Query Language) in the form of stored procedures to determine desired decision logic. This has the disadvantage of being difficult to use since it requires expertise to produce efficient SQL procedures and also typically exposes a user to the complexities involved in the data relationships between the expression and the application that uses it. It also bypasses the abstraction and data integrity rules that are written into the application business objects.

A system according to invention principles addresses these problems and derivative problems.

SUMMARY OF THE INVENTION

A user friendly interface system enables a user to incorporate, in an executable application, custom decision logic in the form of an expression involving a high-level script language. A system supports use of user customizable expressions by a plurality of different executable applications. The system involves a database for associating a particular application of the plurality of different executable applications with a particular data item of a plurality of selectable data items available for incorporation in a user entered expression and for excluding use by the particular application of another data item of the plurality of selectable data items. An interface processor receives a user entered expression and incorporates the particular data item in the user entered expression to provide a resultant expression for use by the particular application. An expression processor uses data from the particular application in resolving the resultant expression to provide a result.

BRIEF DESCRIPTION OF THE DRAWING

FIG. 6 shows a business application display window for use in displaying an expression employed by the application, according to invention principles.

DETAILED DESCRIPTION OF PREFERRED EMBODIMENTS

Figure 1:
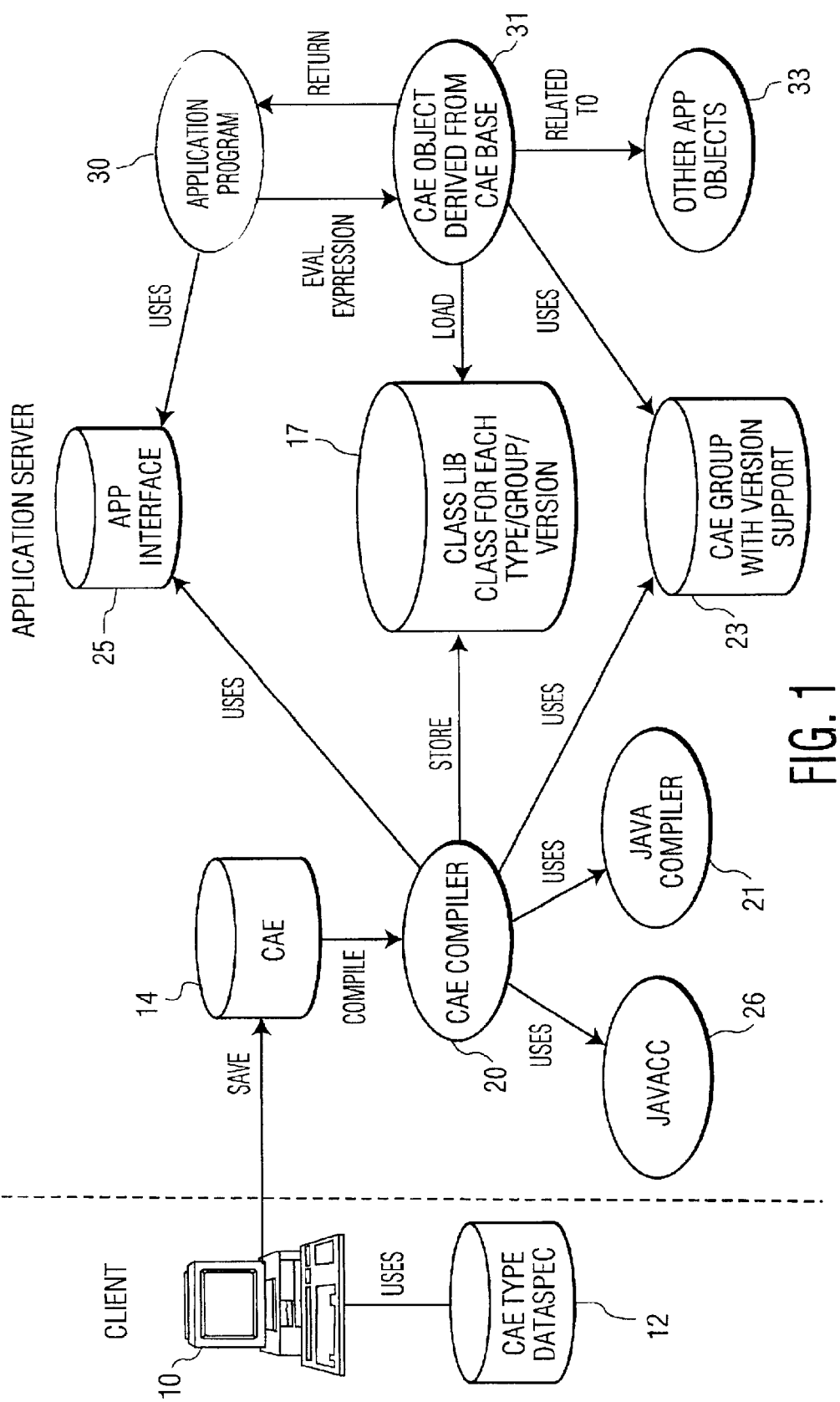
FIG. 1 shows a user interface and processing system supporting use of customizable expressions, according to invention principles.

FIG. 1 shows a user interface and processing system supporting use of customizable expressions. The system enables the incorporation of desired decision logic in a business application to tailor the application function to user requirements. The decision logic is entered in the form of an expression involving a high-level, user friendly, easy to understand script language. The user interface, for example, allows application business users, such as users involved in health care insurance reimbursement, to customize their institution rules for assigning services to appropriate contract packages and terms. In this context, a customizable expression may also be used to allow users to define formulas for calculating rates of reimbursement and to enable users to define rules for assigning services to contract packages and terms. A customizable expression may also be used to enable a user to define rules for routing scheduled task lists to individuals or groups of individuals assigned to perform the tasks. Further, the customizable expression processing system is readily applicable to incorporate various forms of expression into various business and other applications.

The high-level, user friendly, easy to understand script language advantageously used to enter customizable expression decision logic shields users from the underlying complexities involved in incorporating a user defined expression within an application (such as involved in using JAVA or SQL, for example). It is also adaptable to meet different requirements and obviates any need to anticipate the many ways a user may formulate expressions to process data. The high level script language also facilitates the provision of a user interface that is straightforward to use by a member of the general public and yet provides the capability to implement any function that the user may desire.

The customizable expression processing system also supports an efficient method of maintaining and executing user entered customizable expressions in conjunction with associated business applications. This method advantageously involves version numbering expressions so that a latest expression version may be dynamically identified and compiled together with an associated business application. This is done to ensure execution speed of the composite application comprising the business application plus latest desired expression is not degraded. The version numbering system also supports the maintenance of multiple expressions as well as the use of an expression by multiple different applications and may also be used to ensure that a business application uses the same version of an expression throughout the lifetime of the business application. Further, the disclosed system enables restriction and control of the data that is exposed to a user for entry in an expression and supports association of descriptive information with items of data exposed to users. In addition multiple user selectable template expressions are provided for user alteration advantageously facilitating the user interface process.

The principles of the invention may be applied to any system and applications involving user entry of resolvable expressions to modify application function. Further, although the preferred embodiment is described as being implemented in JAVA, and XML this is exemplary only. The system may be implemented in a variety of different languages as the principles of the invention are independent of languages used.

In the system of FIG. 1 a user enters an expression representing decision logic for use by a business application program 30 to tailor the application function to user requirements. An exemplary expression used to determine patient eligibility for reimbursement for a particular service is shown within item 579 of FIG. 6. The user enters the expression via a PC user interface 10 display menu associated with application interface 25 of application 30. The application interface 25 display menu provides windows supporting user selection of predetermined items 12 associated with application 30. Specifically, a user selects (from items 12) a predetermined template expression for amendment with predetermined data items and expression operators that are compatible with application 30 thereby advantageously simplifying the user interface. Application 30 employs one or more data specification XML files specifically associated with particular interface 25 of application 30. The data specification XML files are stored in an application 30 database and determine the predetermined data items 12 that are available for selection by a user via display windows of the PC user interface 10 display menu. The application 30 data specification files also optionally provide a user accessible description of individual exposed data items. Alternatively, in another embodiment a user may compose and apply an expression using PC interface 10 without using items 12.

Application 30 allocates both a Type and Group identifier to an expression entered by a user via the PC user interface 10 display menu associated with the application interface 25. The Type identifier identifies a specification used to define the input and output parameters that are received or provided by an application 30 procedure involved in processing the entered expression. An application such as application 30 typically comprises one or more procedures (termed objects) such as objects 31 and 33 of FIG. 1. In more complex embodiments multiple application 30 procedures (e.g., objects 33 of FIG. 1) may be involved in processing an entered expression. The expressions of a specific Type are compiled into a single JAVA class file. A JAVA class comprises a user defined data type and identifies the members of the class. The Group identifier allocated to an expression by application 30 identifies expressions of a particular Type that are compiled together into a single JAVA class file. Therefore expressions of a particular Type may comprise different Groups of expressions and a particular Type expression may be in more than one Group. Different Group identifiers may be allocated to a template (model) expression of a particular Type available for user selection and to a user entered expression of the same Type, for example.

A high level script language expression entered by a user via the PC interface 10 display menu associated with the application interface 25 is retained, together with a user entered identification name for the expression, in application server storage 14. Application 30 operating on the server initiates compilation of the high level script language expression into code of a particular JAVA class executable in conjunction with compiled application 30 in response to receiving the user entered expression. In other embodiments, application 30 may initiate compilation using a different (i.e., non-Java) language compiler and upon other events including, for example, a convenient processing point when interruption of application 30 is not disruptive or upon collection of several expressions, for example. The entered expression is compiled into a JAVA class determined based on the Type and Group identifiers previously allocated to the entered expression by application 30. The resultant compiled expression is in the form of a JAVA class source file. Further, since application 30 is a JAVA application, application 30 and the compiled expression operate together with negligible degradation in speed. Application 30 initiates compilation of the entered expression using expression compiler 20 which in turn employs JAVA compiler 21 operating in conjunction with a SUN Microsystems tool JAVACC (a JAVA parser generator—unit 26) downloadable from Sun Microsystems web site with negligible degradation in speed associated with data marshalling.

Unit 20 applies the Type and Group identifiers previously allocated to the user entered expression by application 30 in compiling the expression into a particular selected JAVA class file. Further, unit 23 allocates a version number to the compiled JAVA class file so that a latest expression version may be dynamically identified and compiled together with business application 30 and associated application objects 31 and 33. This enables the latest compiled version of the expression to be identified and used at application 30 execution time. Thereby execution speed of the composite application comprising application 30 including objects 31 and 33 together with the compiled expression is not degraded. The resultant compiled JAVA class file is stored in accordance with allocated Type, Group and version attributes in unit 17 for access and loading of the latest expression version together with application object 31 (and other objects 33) upon initiation of execution of application 30.

In operation, application 30 calls an application object 31 procedure for evaluating a user created expression stored in unit 17 in response to user initiation of expression evaluation via interface 25. For this purpose application 30 employs the Type and Group identifiers associated, both with the application interface 25, and with the expression to be evaluated, for use in accessing this expression stored in unit 17. The identified compiled expression is therefore accessed from unit 17 and executed using data provided by application object 31. In this manner application 30 controls the linking of compiled JAVA class expressions in unit 17 with application objects 31 and 33 for creating a composite executable compiled application. Therefore application 30 governs the operation timing and use of created expressions. Further, application 30 also initiates generation of user interface windows and menus to support users entry, amendment and maintenance of an expression. It should be noted that in another embodiment a user entered expression may be interpreted (rather than compiled) in response to initiation of execution of application 30. Though this approach may involve a reduction in application 30 execution speed.

Figure 2:
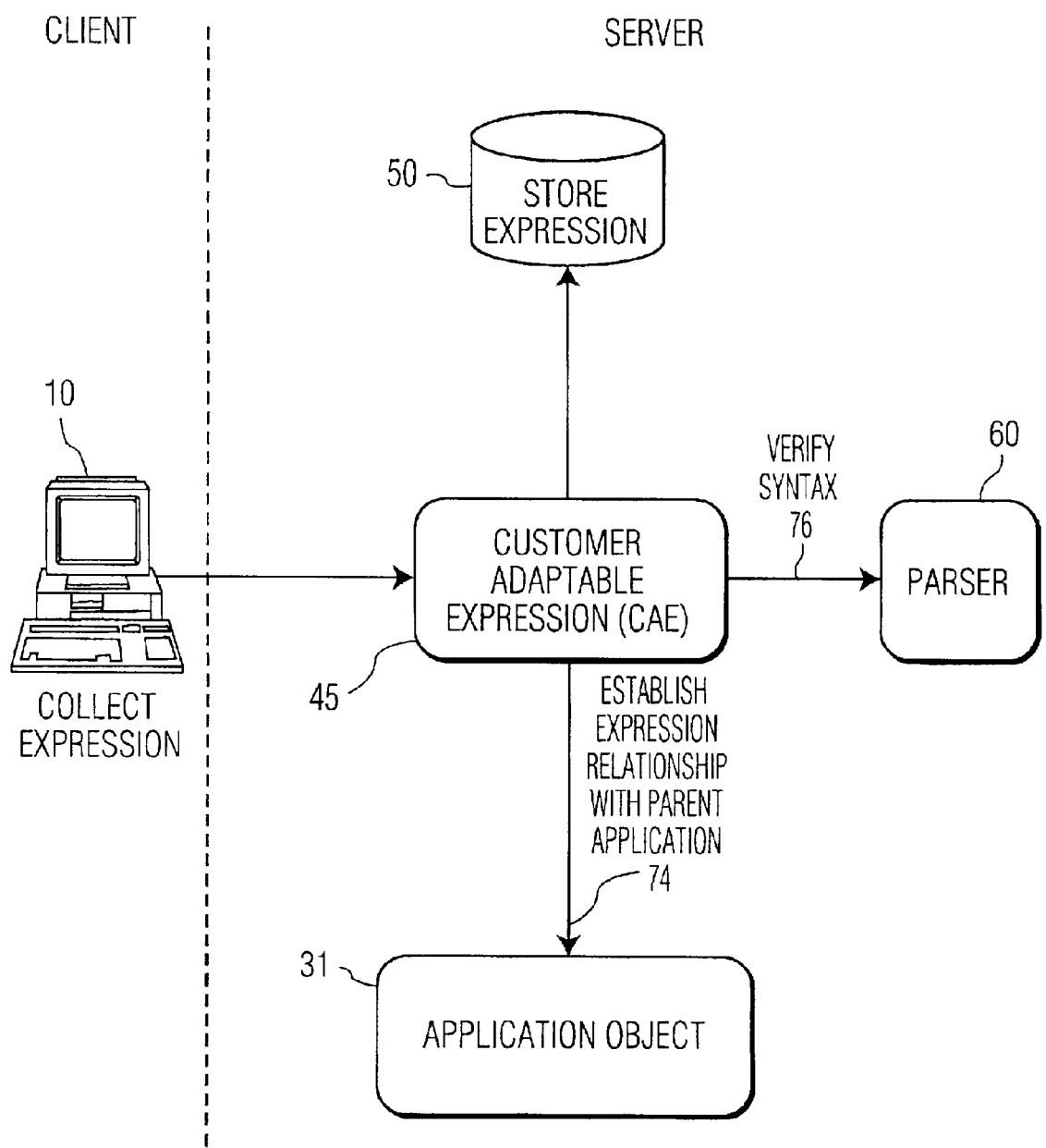
FIG. 2 shows system functions involved in creating and processing user customizable expressions, according to invention principles.

FIG. 2 shows preliminary system functions involved in creating and preparing a user entered expression for use by application 30 (FIG. 1). An expression 45 entered by a user via the PC user interface 10 display menu associated with the application interface 25 (FIG. 1) is parsed by parser 60 of FIG. 2 to verify (76) the expression syntax is valid. Specifically, an entered expression is deemed valid if the expression syntax is compatible with application object 31 (of application 30) used to process the expression. Upon successful validation, if there already is a matching compiled group, then the expressions are recompiled with a new version number. The application 30 allocates both a Type and Group identifier associated with application interface 25 (FIG. 1) to the entered expression for use in establishing the expression relationship (74) with application object 31. Failure to validate the entered expression causes generation of a displayed message to a user indicating a syntax check failure and identifying particular elements or features of the entered expression that are unacceptable. Upon successful validation and establishing the expression relationship with application object 31, the resultant expression is stored in unit 50.

Figure 3:
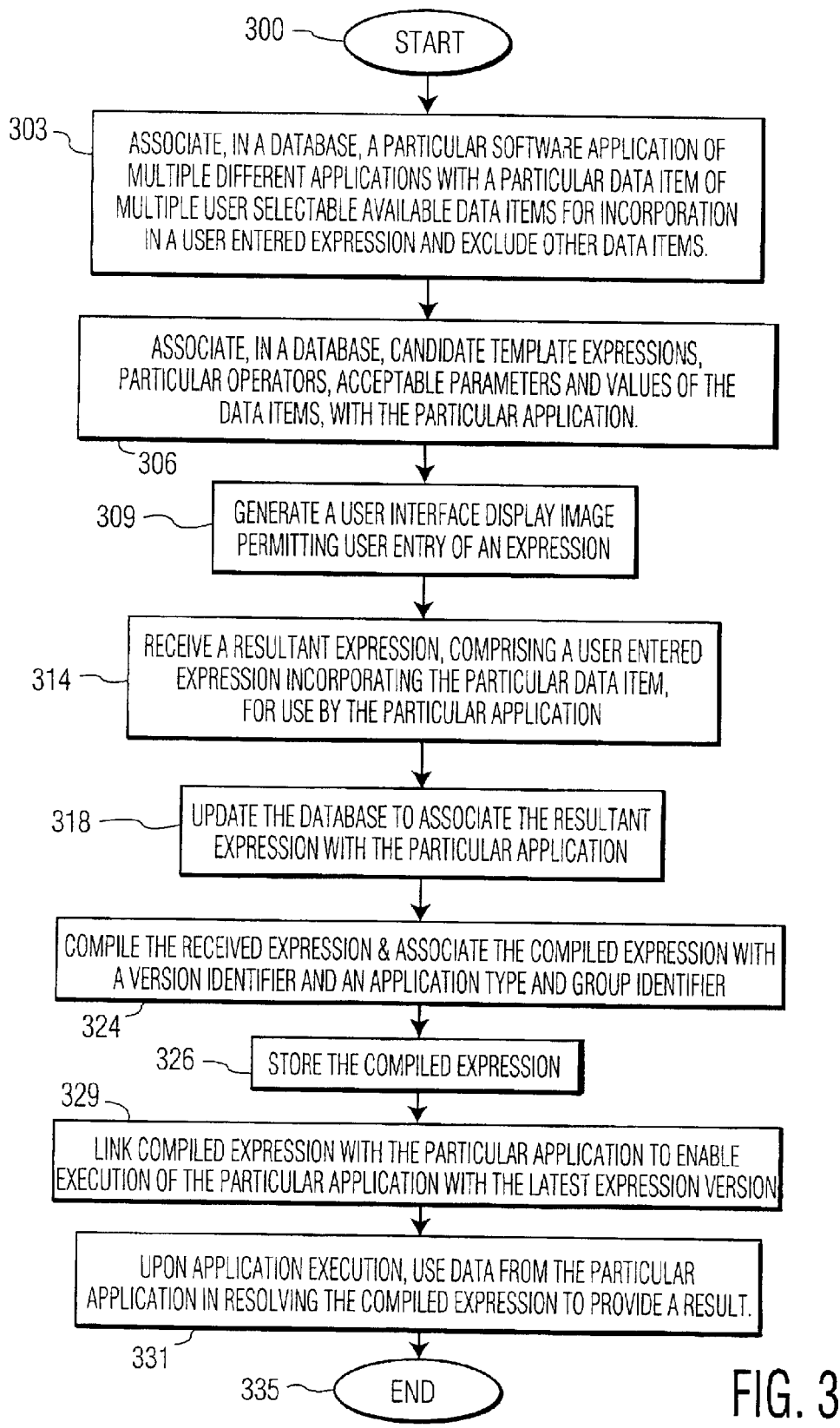
FIG. 3 shows a flowchart of a process supporting use of user customizable expressions by multiple different executable applications, according to invention principles.

FIG. 3 shows a flowchart of a server system process using a database to support use of user customizable expressions by multiple different executable applications, e.g., application 30 plus another different application 90 (not shown in the drawings to preserve drawing clarity). In step 303, following the start at step 300, the server system employs a database to associate application interface 25 of application 30 (FIG. 1) with a particular set of data items to be made available for user inclusion in an expression to be used by application 30. Specifically, this particular set of data items is associated with an expression entered using a menu associated with application interface 25. Other data items are excluded from being available for inclusion in the expression entered using the menu associated with application interface 25. The server system also uses the database to associate application 90 with a different set of data items to be made available for user inclusion in an expression for use by application 90. Data items that may be selectively made available for incorporation in an expression in a health care insurance reimbursement application may comprise, for example, a patient identifier, a patient physical characteristic, patient address information and patient medical record information. In practice, the type of data items to be used depends on the nature of the application processing them.

Figure 6:
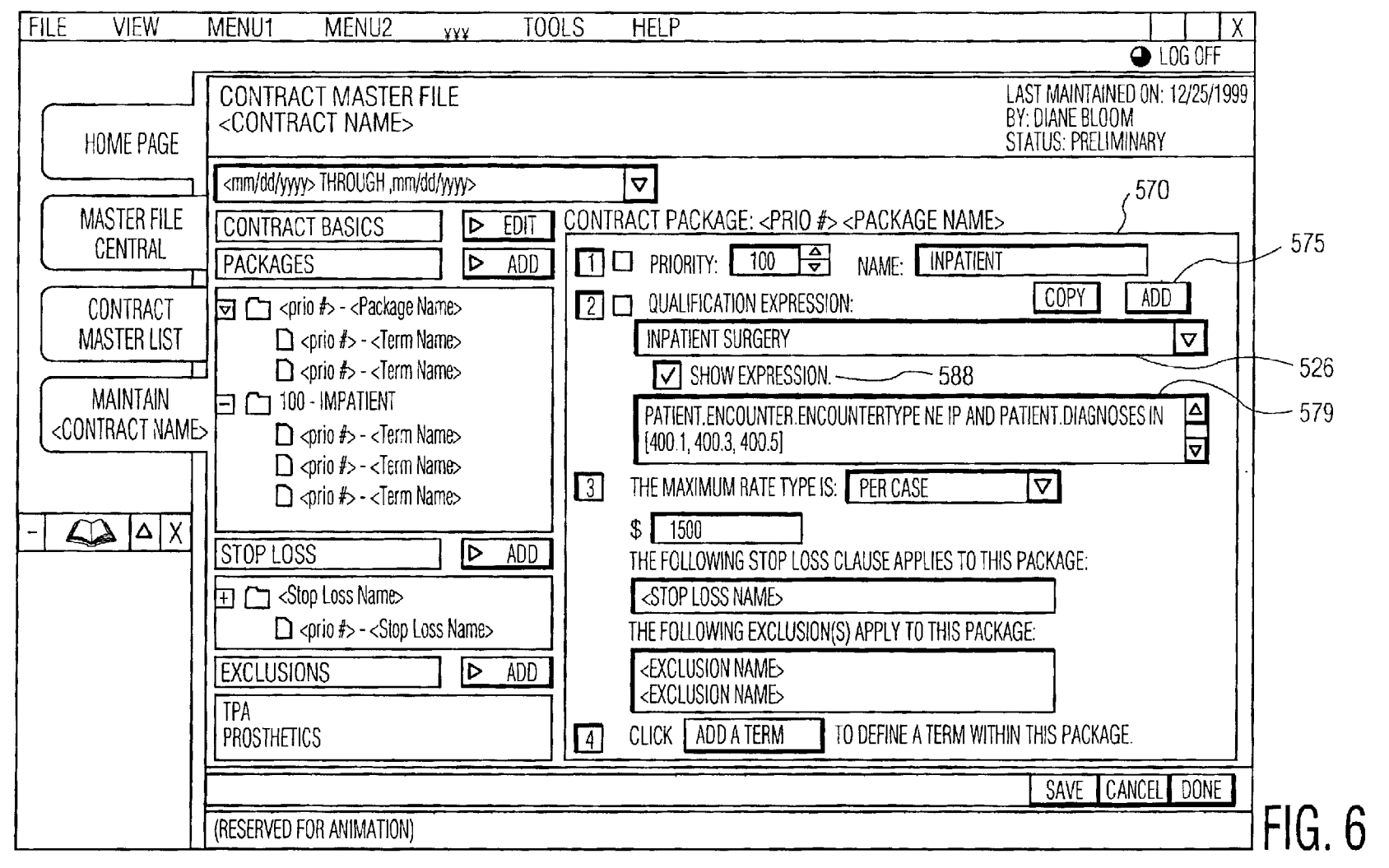

An illustrative business application display window for use in displaying an expression employed by an application interface (such as by application interface 25 of application 30) is shown in FIG. 6. The application interface display window 570 of FIG. 6 illustrates use of a healthcare insurance reimbursement application (e.g., application 30) to determine qualification for insurance reimbursement. Specifically, the FIG. 6 display image window allows a user to select a previously created expression via display element 526 and display it in element 579 in response to selection of item 588. The particular expression in item 579 shown in FIG. 6 is processed by the application to determine patient qualification for reimbursement for diagnostic procedures for particular conditions (specifically, medical conditions identified by codes 400.1, 400.2 and 400.3). A user may select icon 575 to add in an expression from storage to the menu of available expressions (displayable via element 579) in the FIG. 6 interface window.

In step 306 of FIG. 3, the server system employs the database to further associate application interface 25 of application 30 with candidate template expressions available for user selection and entry using interface 25. The server system also advantageously receives user selection information identifying one of the multiple candidate template expressions for inclusion and amendment within a displayed expression entry prompt element. This provides a user friendly and efficient way for a user to easily derive a desired function. The server system similarly associates application interface 25 of application 30 with expression operators and acceptable parameters and values for user selected data items as well as with an identifier indicating the particular application 30 and application interface 25 involved. A user interface display is generated by the server system in step 309 for providing a user interface display image (exemplified in FIG. 7) supporting user entry of an expression. In step 314, the server system receives a user entered expression incorporating one or more data items selected from the available items specifically associated with application interface 25 of application 30. The server system updates the database in step 318 to associate the received expression with particular application interface 25 of application 30.

In step 324, the server system compiles the received expression and associates the compiled expression with a version identifier and an application Type and Group identifier before storing the compiled expression in step 326. Alternatively, the expression may be associated with one or more of the version identifier, application Type and Group identifier before compilation as described in connection with FIGS. 1 and 2. The application Type indicator identifies a particular application and application interface (of multiple applications) involved in supporting entry and processing of a user entered expression. In step 329, the server system links the compiled expression with application 30 and specific objects within the application (such as objects 31 and 33 of FIG. 1) to support execution of application 30 together with the compiled expression. The expression version number is used to ensure the latest compiled expression version is employed by application 30. However, a desired prior version expression may alternatively be selected and applied. In step 331, the compiled expression is resolved using data provided from application 30 (and objects 31 and 33) and a result is returned to application 30 for display and access by a user. The result may comprise a computed value, a definition of rules to be used, a verification that a resolved expression is true (or not true), or an identification of records derived from a search of a database in response to resolving the expression, for example. A user customizable expression may be used to tailor an application function in a multitude of ways. The expression may be used to customize formulas, to search for particular records, to assign services to an entity, to define rules for routing scheduled task lists and other purposes. Further, a notification may be processed for display to a user by application 30 in response to the received result. The notification may indicate a success or failure of a task such as an assignment of records to an entity or to indicate a reason for failure, for example. The process of FIG. 3 terminates at step 335.

Figure 4:
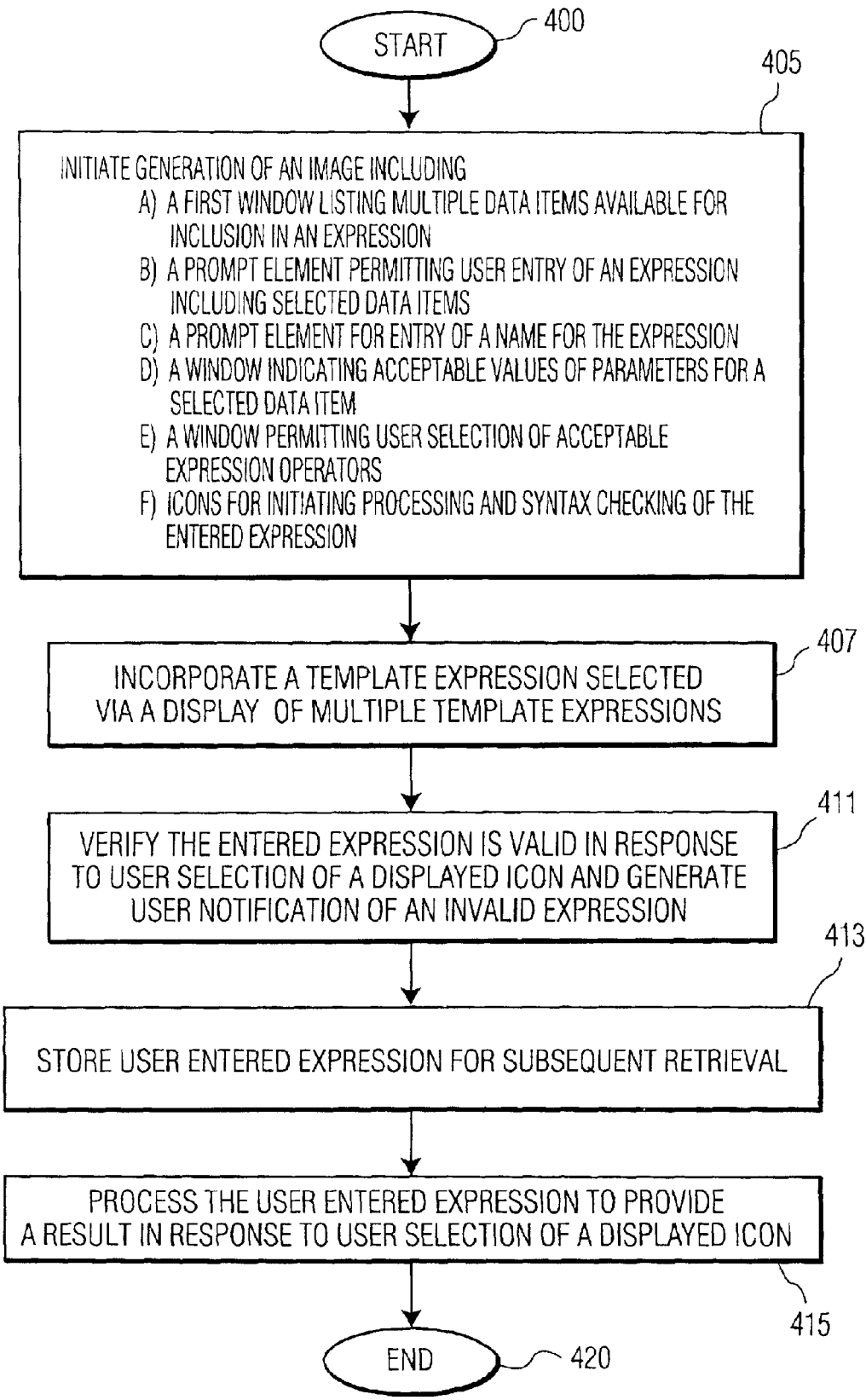
FIG. 4 shows a flowchart of a process for providing a user interface display image supporting user entry of an expression, according to invention principles.

FIG. 4 shows a flowchart of a process (as employed in step 309 of FIG. 3) used by application interface 25 of application 30 (FIG. 1) for providing a user interface display image supporting user entry of an expression. In step 405 of FIG. 4, following the start at step 400, application 30 initiates generation of a user interface display image supporting user creation of an expression as exemplified in FIG. 7. The generated display image includes a window 710 listing multiple data items including a set of data items available for inclusion in an expression entered by a user via prompt element 500. The data items are hierarchically listed within window 710 and each data item is associated with an item description displayed in response to a user placing a cursor upon the item representative icon. The set of data items available for inclusion is specifically associated with application interface 25 and application 30. A different set of data items is associated with a corresponding different application (e.g., application 90 as previously mentioned). The different set of data items is also made available for user selection via window 710 for inclusion in an expression for use with the different application. Data items available for inclusion and use by a particular application are visually highlighted in window 710 relative to data items that are not available to the particular application.

The generated display image also includes a prompt element 700 supporting user entry of an expression identification name and a window 725 indicating acceptable values, parameters and ranges of values and parameters for a data item selected via window 710. The generated display image further includes a window 726 permitting user selection from a set of expression operators available for inclusion in an expression entered by a user via prompt element 500. The set of expression operators available for inclusion is specifically associated with application interface 25 and application 30 in a similar fashion to the set data items in window 710. Icons 715 and 719 enable a user to initiate exit from the expression entry display menu of FIG. 7 upon successful expression creation and storage or upon cancellation of use of the FIG. 7 menu, respectively.

Figure 7:
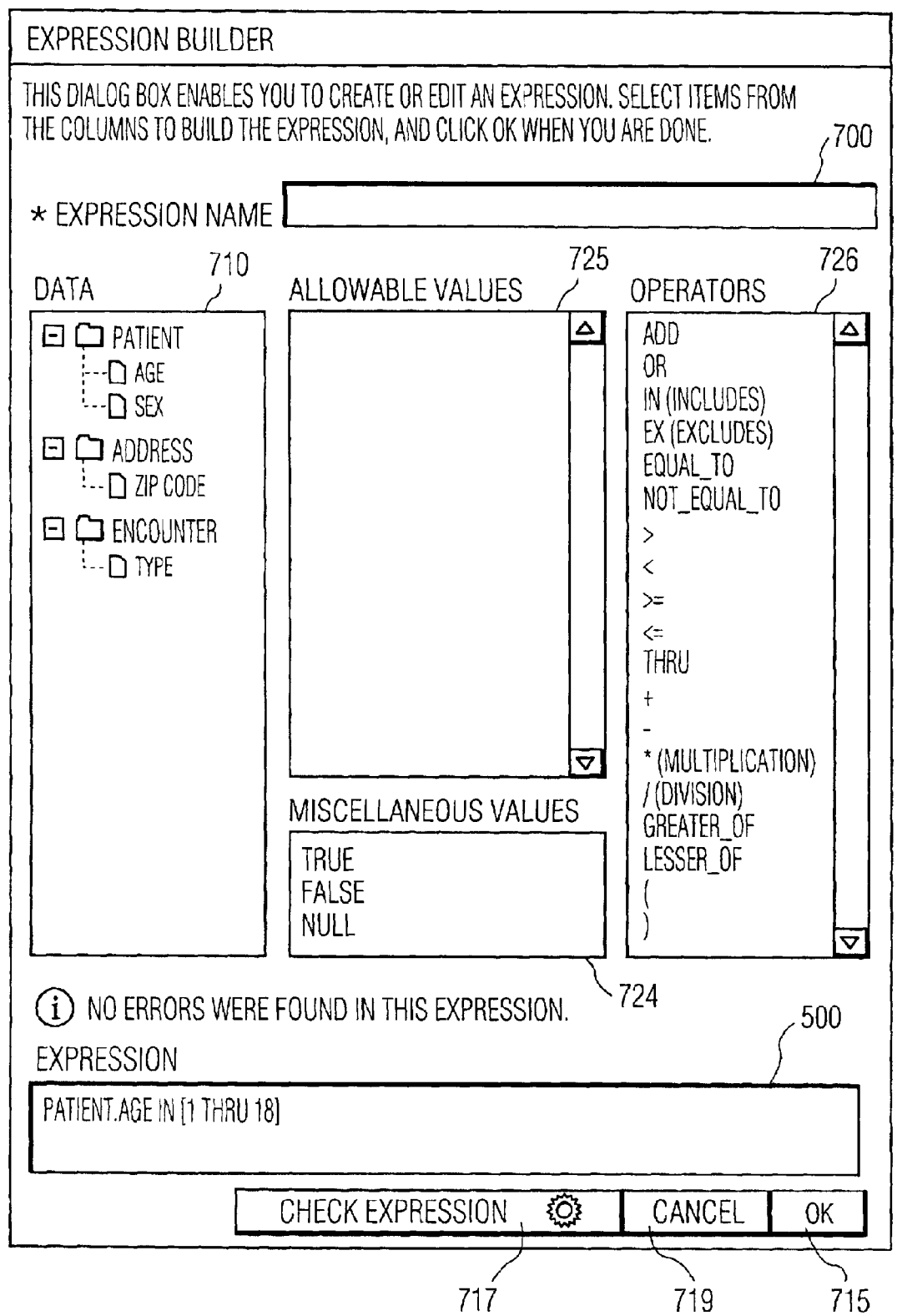
FIG. 7 shows a user interface display image supporting user creation of an expression, according to invention principles.

In step 407 of FIG. 4, application 30 initiates display of a window (not shown to preserve clarity) including multiple template expressions available for user selection and inclusion in expression entry prompt element 500 (FIG. 7). The set of template expressions available for inclusion is specifically associated with application interface 25 and application 30 in a similar fashion to the set data items of window 710 and the operators of window 726. Upon user selection of a particular template expression from multiple available displayed expressions the particular expression is included for user amendment and customization in prompt element 500 (FIG. 7). In step 411, upon editing and amendment of the template expression to provide the user desired expression, the expression syntax is parsed and validated in response to user selection of icon 717 (FIG. 7). If a syntax error is detected the user is notified by a displayed message indicating a syntax check failure and identifying particular elements or features of the entered expression that are unacceptable. An entered expression is deemed valid if the expression syntax is compatible with application 30 (and its software objects and procedures) used to process the expression. Upon successful validation, application 30 stores the expression in step 413 in response to user selection of icon 715 (FIG. 7). Application 30 processes the stored expression in step 415 to provide a result in response to user selection of an icon in a user interface menu of application interface 25 of application 30. The process of FIG. 4 terminates at step 420.

Figure 5:
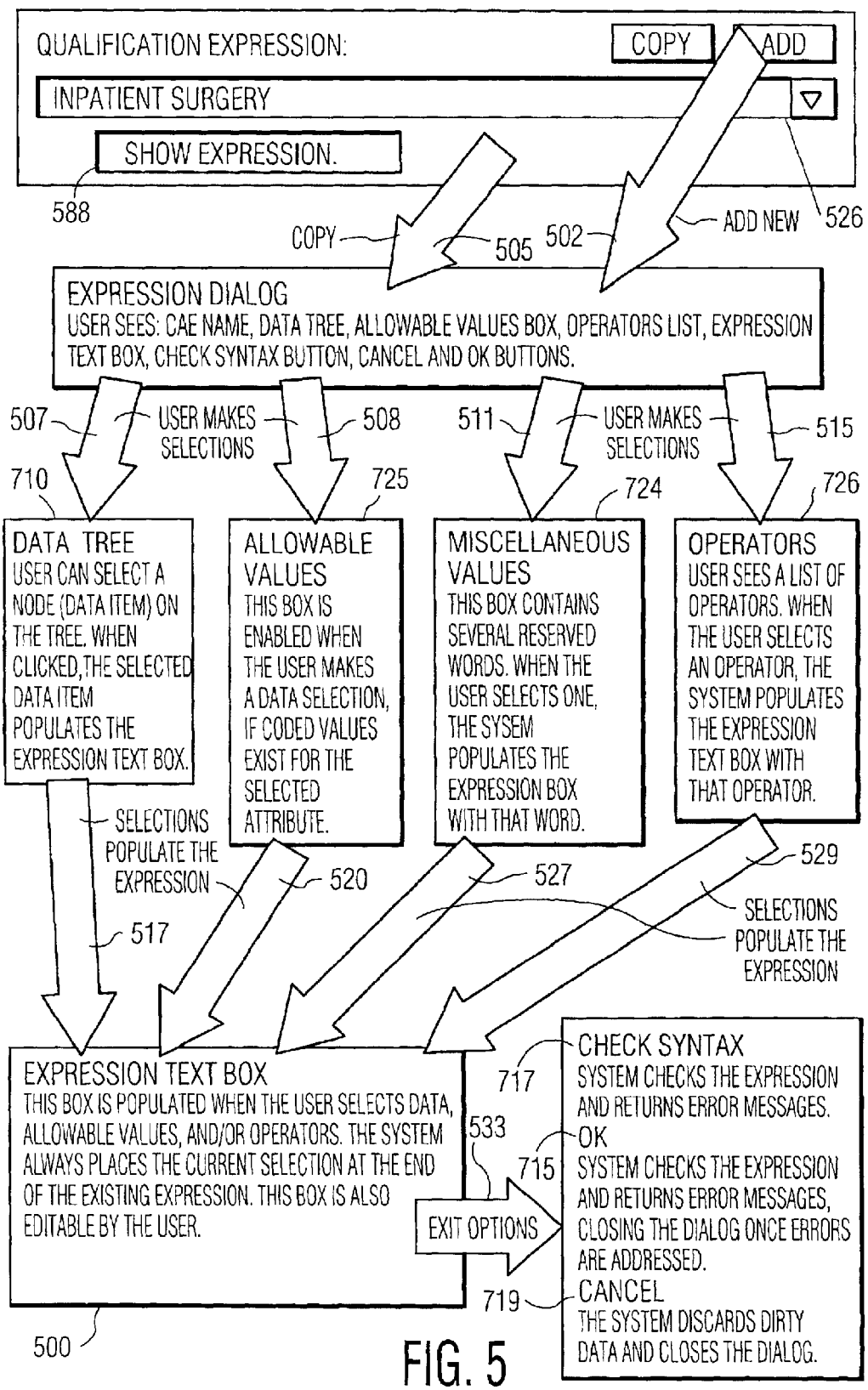
FIG. 5 shows a diagram showing user interaction and navigation aspects associated with the expression entry user interface, according to invention principles.

FIG. 5 shows a diagram illustrating user interaction and navigation operation of application 30 and the application 25 user interface exemplified in FIG. 6 and the expression entry user interface exemplified in FIG. 7. A user selects a previously created expression by its name via element 526 in FIG. 5 (also shown in FIG. 6). The selected expression is displayed in an expression creation menu exemplified in FIG. 7 (specifically in item 500 of FIG. 7) in response to user selection of icon 588 of FIG. 5 (also shown in FIG. 6). A user selects data items (command 507) to populate expression display element 500 via window 710. A user also selects (commands 508, 511 and 515) other items to populate the expression including allowable values via window 725, miscellaneous values via window 724 and operators via window 726. Allowable values in window 725 may be displayed for informational purposes or may be selectable by a user for inclusion in the expression depending on the parameter involved. Upon user selection of various items via commands 507, 508, 511 and 515, the selected items are included in the expression display element 500 via corresponding actions 517, 520, 527 and 529.

A user edits the populated expression in display element 500 to meet his requirements and upon completion of editing, selects an exit option (command 533). Exit options are initiated via user selection of icons 715, 717 or 719 (FIGS. 5 and 7). User selection of icon 717 initiates a syntax check of the expression which results in either successful validation of the expression or user notification of a syntax error by a displayed message. Similarly, user selection of icon 715 initiates a syntax check of the expression which also results in either successful validation notification to a user or user notification of a syntax error by a displayed message. However, successful expression syntax validation in response to selection of icon 715 also results in exit from the display menu of FIG. 7. User selection of icon 719 results in discarding non-stored data and exit from the display menu of FIG. 7. Following creation of an expression using the interaction and navigation procedure of FIG. 5, the expression is available for processing by application 30 to provide a result in response to user selection of an icon in a user interface menu of application interface 25.

The architecture, user interfaces and processes presented in FIGS. 1-7 are not exclusive and may be adapted to accommodate different elements and properties. Other architectures and processes may also be derived in accordance with the principles of the invention to accomplish the same objectives. Further, the inventive principles may be incorporated into any language based applications not just JAVA or XML compatible applications. For this purpose a data dictionary may be readily provided including expression data items, operators and other predetermined elements associated with particular applications and application interfaces that may be used. Thereby avoiding the need to be constrained to use of JAVA type class files. Further, the inventive principles may be implemented in JAVA code incorporated into a non-JAVA application capable of invoking the JAVA code and executing customer provided expression decision logic.

Description of Terms

JAVA—A simple, object-oriented, distributed, robust, secure architecture neutral, multizhreaded language, additional information is available via Java associated websites on the Internet.

Extensible Markup Language (XML)—this is an important Internet standard used to encode structured data passed between computer systems. The World Wide Web Consortium maintains this public standard. Additional information is available at web sites associated with the consortium on tile Internet.

JAVACC—Java parser generator. Additional information is available at Java associated websites on the Internet.

What is claimed is:

1. A system supporting use of user customizable expressions by a plurality of different executable applications, comprising:
   a database for associating a particular application of said plurality of different executable applications with a particular data item of a plurality of selectable data items available for incorporation in a user entered expression and for excluding use by said particular application of data items of said plurality of selectable data items unassociated with said particular application;
   an interface processor for receiving a user entered expression and for incorporating said particular data item in said user entered expression to provide a resultant expression for use by said particular application; and
   an expression processor for operating on data from said particular application with said resultant expression to provide a calculated result value.

2. A system according to claim 1, wherein
   said expression processor resolves said resultant expression to provide a calculated result comprising at least one of, (a) a financial reimbursement sum determined per health care policy terms and (b) a computed value.

3. A system according to claim 1, wherein
   said resultant expression is a logical expression and said data items comprise at least one of (a) a patient identifier, (b) a medical condition identifier, (c) a patient address and (d) patient medical record information.

4. A system according to claim 1, wherein
   said resultant expression comprises an algebraic expression including one or more operators, and
   said database associates said particular application with algebraic expression operators including at least two of (a) a multiplication operator, (b) a division operator, (c) an addition operator and (d) a subtraction operator.

5. A system according to claim 1, wherein
   said resultant expression is a logical expression and said particular data item comprises at least one of, (i) a patient identifier and (ii) a medical condition identifier, and
   said database associates said particular data item with at least one of, (a) an acceptable parameter, (b) an acceptable value, (c) an acceptable range of values and (d) an acceptable range of parameters.

6. A system according to claim 1, wherein
   said interface processor allocates a version identifier to said resultant expression and
   said expression processor selects a latest version of said resultant expression based on version identifier.

7. A system according to claim 1, wherein
   said expression processor updates said database to associate said resultant expression with said particular application.

8. A system according to claim 1, wherein
   said database associates a plurality of expressions with said particular application.

9. A system according to claim 1, including
   a compiler for compiling said particular application together with said resultant expression to provide a particular executable application.

10. A system supporting use of user customizable expressions by a plurality of different executable applications, comprising:
    a database for associating a particular application of said plurality of different executable applications with a particular data item of a
    plurality of selectable data items available for incorporation in a user entered expression and for excluding use by said particular application of another data item of said plurality of selectable data items;
    an interface processor for receiving a user entered expression and for incorporating said particular data item in said user entered expression to provide a resultant expression for use by said particular application;
    an expression processor for using data from said particular application in resolving said resultant expression to provide a result; and
    a compiler far compiling said particular application together with said resultant expression to provide a particular executable application wherein
    said expression processor allocates a version identifying number to a created resultant expression and said version identifying number is used by said compiler in compiling the latest version of said resultant expression with said particular application.

11. A system according to claim 1, wherein
    said database associates a particular procedure of said particular application with said particular data item and excludes use by said particular procedure of another data item of said plurality of selectable data items unassociated with said particular procedure, and
    said resultant expression is used by said particular procedure.

12. A system according to claim 1, wherein
    said database associates a plurality of candidate template expressions with said particular application and said interface processor receives user entered information for selecting one of said template expressions.

13. A system supporting use of user customizable expressions by a plurality of different executable applications, comprising:
    a database for associating a procedure of a particular application of said plurality of different executable applications with a particular data item of a plurality of selectable data items available for incorporation in a user entered expression and for excluding use by said particular procedure of data items of said plurality of selectable data items unassociated with said particular procedure;

an interface processor for receiving a user entered expression and for incorporating said particular data item in said user entered expression to provide a resultant expression for use by said particular procedure; and an expression processor for operating on data from said particular application with said resultant expression to provide a calculated result value.

14. A system according to claim 13, wherein said database associates said procedure of said particular application with a plurality of resultant expressions.

15. A system according to claim 13, wherein said database associates a plurality of procedures of said particular application with a plurality of expressions.

16. A system according to claim 13, including a a user interface processor for initiating provision of an image prompt element permitting user entry of an expression.

17. A system supporting use of user customizable expressions by a plurality of different executable applications, comprising:

an interface processor for receiving a user entered expression;

a database for associating a particular application of said plurality of different executable applications with said user entered expression and for associating a version identifier with said user entered expression; and an execution processor using said version identifier to identify a latest version of said entered expression and for processing said particular application with said latest version of said entered expression to provide executable code representative of said particular application.

18. A system according to claim 17, including a said execution processor comprises at least one of, (a) a code compiler and (b) a code interpreter.

19. A system according to claim 17, including a an expression processor for importing data from said particular application in resolving said latest version of said entered expression to provide a result.

20. A method supporting use of user customizable expressions by a plurality of different executable applications, comprising the activities of:

associating a particular application of said plurality of different executable applications with a particular data item of a plurality of selectable data items available for incorporation in a user entered expression;

excluding use by said particular application of data items of said plurality of selectable data items unassociated with said particular application;

receiving a user entered expression;

incorporating said particular data item in said user entered expression to provide a resultant expression for use by said particular application; and operating on data from said particular application with said resultant expression to provide a calculated result value.

21. A method supporting use of user customizable expressions by a plurality of different executable applications, comprising the activities of:

associating a procedure of a particular application of said plurality of different executable applications with a particular data item of a plurality of selectable data items available for incorporation in a user entered expression;

excluding use by said particular procedure of data items of said plurality of selectable data items unassociated with said particular procedure;

receiving a user entered expression;

incorporating said particular data item in said user entered expression to provide a resultant expression for use by said particular procedure; and operating on data from said particular application with said resultant expression to provide a calculated result value.

22. A method supporting use of user customizable expressions by a plurality of different executable applications, comprising the activities of:

receiving a user entered expression;

associating a particular application of said plurality of different executable applications with said user entered expression;

associating a version identifier with said user entered expression;

using said version identifier to identify a latest version of said entered expression; and processing said particular application with said latest version of said entered expression to provide executable code representative of said particular application.

* * * * *